United States Patent
Naedler

(10) Patent No.: US 6,401,743 B1
(45) Date of Patent: Jun. 11, 2002

(54) AUTOMATIC TIRE INFLATION SYSTEM HAVING A PRESSURE REGULATOR WITH AN INTEGRATED LEAK DETECTION SWITCH

(75) Inventor: Mark H. Naedler, Houston, TX (US)

(73) Assignee: Vehicle Inflation Technologies, Montgomery, TX (US)

( * ) Notice: Subject to any disclaimer, the term of this patent is extended or adjusted under 35 U.S.C. 154(b) by 4 days.

(21) Appl. No.: 09/641,326

(22) Filed: Aug. 18, 2000

Related U.S. Application Data
(60) Provisional application No. 60/150,680, filed on Aug. 25, 1999.

(51) Int. Cl.[7] .......................... B60C 23/00; F16K 37/06
(52) U.S. Cl. ..................... 137/224; 152/417; 73/146.2; 137/554
(58) Field of Search ................ 137/224, 554; 152/415, 416, 417; 73/146.2

(56) References Cited

U.S. PATENT DOCUMENTS

| | | | |
|---|---|---|---|
| 3,276,503 A | 10/1966 | Kilmarx | |
| 4,004,271 A | 1/1977 | Haven et al. | |
| 4,117,281 A | 9/1978 | Leimbach | |
| 4,212,334 A | * 7/1980 | Dudar | 141/197 |
| 4,221,124 A | 9/1980 | Jones | |
| 4,235,185 A | 11/1980 | Byram | |
| 4,418,609 A | 12/1983 | Wickline et al. | |
| 4,418,737 A | 12/1983 | Goodell et al. | |
| 4,421,151 A | 12/1983 | Stumpe | |
| 4,578,669 A | 3/1986 | Woods | |
| 4,678,017 A | 7/1987 | Schultz | |
| 4,724,879 A | * 2/1988 | Schultz et al. | 152/416 |
| 4,763,709 A | 8/1988 | Scholer | |
| 4,862,938 A | 9/1989 | Mittal | |
| 5,141,589 A | 8/1992 | Mittal | |
| 5,174,839 A | 12/1992 | Schultz et al. | |
| 5,253,687 A | * 10/1993 | Beverly et al. | 152/416 |
| 5,560,792 A | * 10/1996 | Anthony | 152/415 |
| 5,767,398 A | 6/1998 | Naedler | |
| 5,857,481 A | 1/1999 | Zimmerman et al. | |
| 6,098,682 A | * 8/2000 | Kis | 152/415 |
| 6,144,295 A | * 11/2000 | Adams et al. | 137/224 |

* cited by examiner

Primary Examiner—John Rivell
Assistant Examiner—Meredith H. Schoenfeld
(74) Attorney, Agent, or Firm—Browning Bushman P.C.

(57) ABSTRACT

Alternate embodiments of a vehicle tire inflation system equipped with a low tire pressure warning device are illustrated wherein a pressure regulating valve controls the pressure delivered to the tires from a pressurized air source and has an integrated electrical switch to indicate if the pressure regulating valve is supplying air to a tire.

8 Claims, 3 Drawing Sheets

AUTOMATIC TIRE INFLATION SYSTEM HAVING A PRESSURE REGULATOR WITH AN INTEGRATED LEAK DETECTION SWITCH

REFERENCE TO RELATED PROVISIONAL APPLICATION

This application claims the benefit of my Provisional Application No. 60/150,680 filed Aug. 25, 1999, and entitled "Automatic Tire Inflation System Having a Pressure Regulator with an Integrated Leak Detection Switch".

FIELD OF THE INVENTION

This invention relates to automatic tire inflation systems for transportation vehicles, and specifically improvements in those that include an indicating device to signal when a tire is receiving air.

BACKGROUND OF THE INVENTION

Automatic tire Inflation systems provide air to a vehicle's tires even while the vehicle is in motion. In the event a tire has lost air pressure, the inflation system will send air to the leaking tire, usually from the frame of the vehicle through a rotary union aligned with the tire's rotational axis. When the inflation system is delivering air, it is beneficial for the driver to be alerted that a tire is requiring inflation. The alert system can be a visual light, a screen display, an audio alarm, or another electronically activated device to warn the driver.

A common alert system uses a pressure regulator and a pressure switch. The pressure regulator is placed between a source of air pressure and the tires to limit the system's inflation pressure and thereby prevent over inflation as shown in U.S. Pat. No. 3,276,503. A normally closed pressure switch is placed between the pressure regulator and the tires, and when a tire looses pressure, dynamic pressure losses cause the pressure downstream of the pressure regulator to drop and close the pressure switch. The signal ceases only when the pressure regulator delivers enough air to refill the tire and build enough pressure to open the pressure switch.

It is difficult for this method to be responsive because the pressure switch's open and close pressure must be adjusted precisely below the regulator's adjusted pressure. Temperature and friction change over time, and the dynamic components in both the pressure switch and pressure regulator do not always respond consistently. If the difference between the two adjusted settings is large, the signal will not be sent until a tire's pressure has greatly decreased. If the difference between the adjusted settings is small, it is possible the switch will close and falsely send a signal due to normal fluctuations in the regulator's output. Also, the presence of two adjustments leads to unnecessary complications in the field.

One design meant to overcome the insensitivity of the pressure regulator and pressure switch combination is the use of a flow switch, as in U.S. Pat. No. 5,767,398. Here the switch requires no adjustment and will close whenever the inflation system is sending air. One drawback to this system is that the operator will not be alerted if a tire has low air pressure and the system has no air pressure to deliver. If the automatic tire inflation system were turned off, the flow switch would not indicate low pressure in a tire to the driver since no air would flow through the switch. Another shortcoming is that a cluster of valves is difficult to package on a vehicle.

Proximity sensors have been used to remotely determine valves' positions in many other applications. When a valve is used in processes where it is inaccessible, it can be desirable to know the valve's position using a sensor. Usually these sensors are used on shut-off type valves with remote actuators so the valve's position can be assured when remotely actuating the valves. The present invention is an improved sensor for detecting an air leak in a tire inflation system. Integrating a sensor directly into the tire inflation system's pressure regulating valve offers advantages over existing methods.

Objects and Advantages

Tire inflation system designers have always included additional pressure switches or valves to determine the tires' pressure status, apparently because the benefits of integrating a switch into a pressure regulator were not considered or understood. The object of the present invention is to provide such a system with an alert switch which will indicate a low tire pressure situation, even when the source of air pressure is depleted or turned off, and without requiring the separate adjustment of a switch, while meeting the needs of a present day commercial tire inflation system. By building the switch into the pressure regulator the switch will respond with certainty to the system's operation. The only adjustment required is setting the pressure regulator. The need for additional valves or external switches is eliminated, helping to package the system within the vehicle. The switch will close immediately if a tire's pressure falls, greatly improving sensitivity. In the event of a low tire pressure situation when there is no pressure from the source, the switch will also close to warn of the condition. In accordance with the present invention a pneumatic valve used in an automatic tire inflation system comprises an inlet, an outlet, and a spring biased pneumatically controlled actuator responsive to the outlet air pressure and capable of opening a normally closed valve seat to allow air flow from the inlet to the outlet to control outlet air pressure, while actuating a switch to indicate a warning signal.

IN THE DRAWINGS

DESCRIPTION OF THE INVENTION

Figure 1:
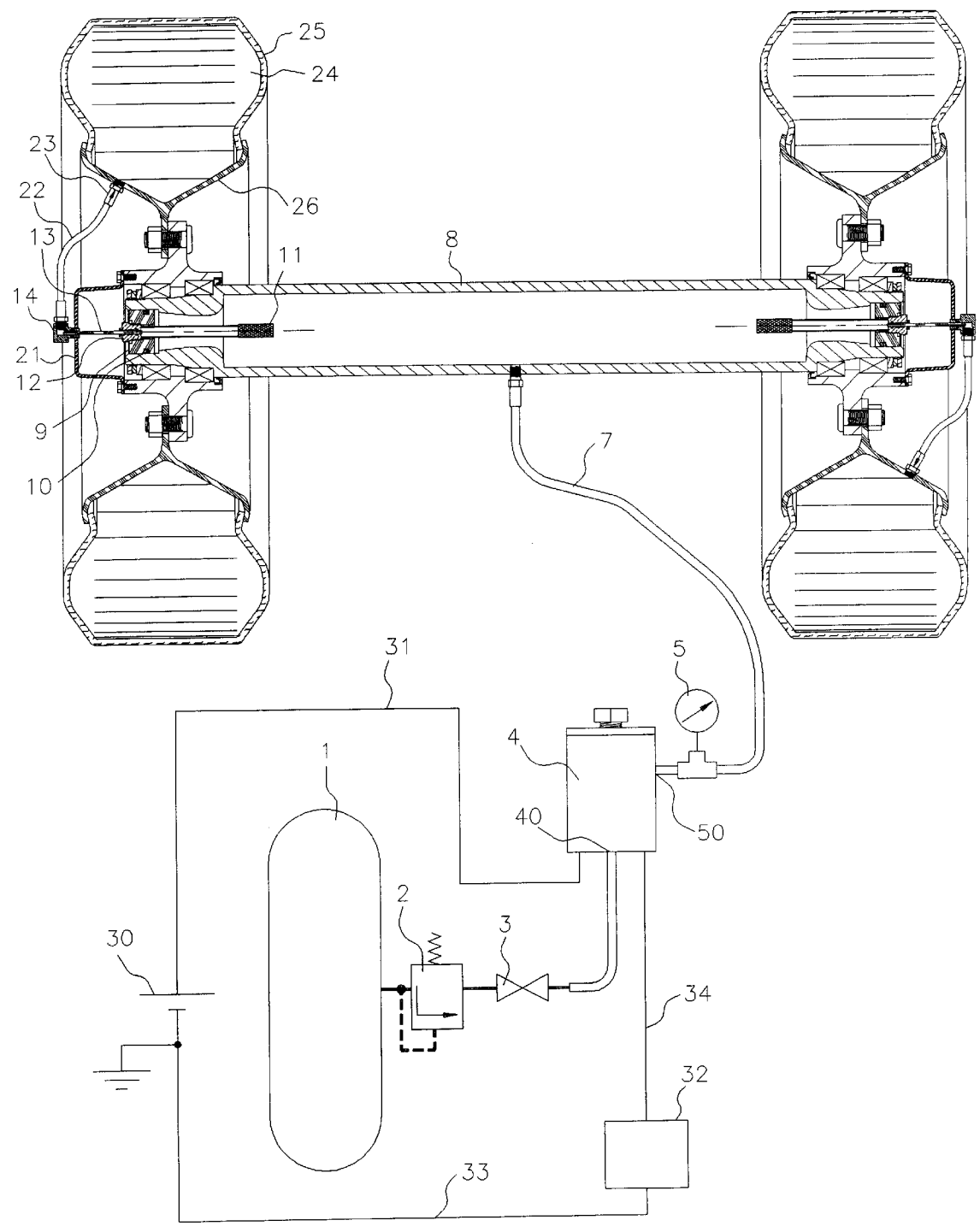
FIG. 1 is a partial cross-sectional view of a vehicle's automatic tire inflation system incorporating the valve with an integrated alert switch.

With reference now to the details of the drawings, FIG. 1 reveals a source of pressurized air 1 which communicates with a pressure protection valve 2. When sufficient pressure is reached from the source 1, the pressure protection valve 2 opens and passes air through the shut-off valve 3 if it is in the open position. The shut-off valve then sends pressurized air to the air inlet 40 of the pressure regulator and switch 4, which, as will be described, regulates the pressure and according to this invention will complete the electrical circuit 30, 31, 32, 33, and 34 if a tire should need air. Regulated air then exits the outlet 50 and is in communication with a conduit 7 that transports air into a hollow axle 8. A pressure gage 5 makes it possible to properly set the pressure regulator 4.

The pressurized air inside the hollow axle is contained at each end by a plug 9 and its corresponding seal 10. A rotary union comprised of a stationary member 12, a tube 13, and a rotating member 14 passes the pressurized air from the axle end to the rotating hubcap 21. This can be seen in detail by referring to patent application Ser. No. 60/145,486. A pressure conduit 22 sends the air through a one-way check valve 23 and into the pressurized area 24 contained within the tire 25 and the wheel 26.

FIG. 1 also illustrates the electrical circuit having a power source 30 which, when a tire's air pressure is low and the electrical switch 4 is in its closed position, completes a circuit with electrically conductive materials 31, 33, and 34, and an electronically activated alert device 32. It should be understood by those familiar in the art that additional circuitry such as a relay switch can be added to the circuit and still provide an electronically triggered warning when the pressure regulator delivers air.

Figure 2:
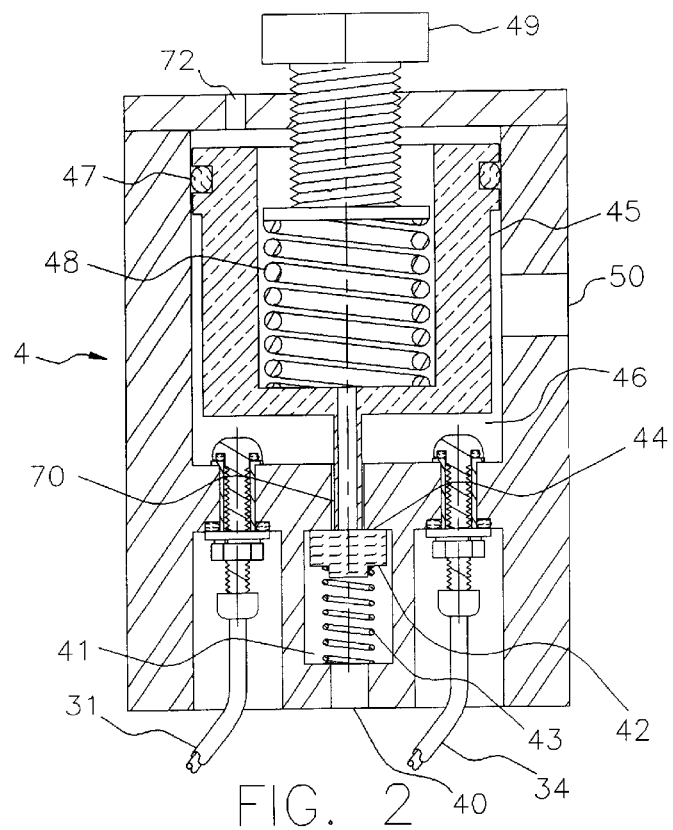
FIG. 2 is a cross-sectional drawing of the valve and switch of the system with the tires fully charged and the regulator in the closed position with the switch in the opened position.

FIG. 2 shows a cross-section of the pressure regulator and switch 4 which includes a hollow body having an air inlet 40 which receives pressurized air to fill an inlet cavity 41 within the body. A face seal 42 is slightly biased by a spring 43 to seat against the sealing surface 44 to close the passage 70. Air pressure inside a piston cavity 46 on the opposite side of the passage 70 forces the actuating member, in this case a piston 45, and its corresponding seal 47, reciprocal in the cavity 46, against the main spring 48. A diaphragm could also serve as the actuator in substitution of the piston 45 and seal 47.

The main spring 48 can be adjusted by turning the threaded adjuster 49 to change the spring force and consequently the output pressure of the regulator. The pressure in the piston cavity 46 creates a force against the affective area of the piston 45 and its seal 47, which are exposed to atmospheric pressure on their opposite side through the vent 72. At a specific pressure in the piston cavity 46 the affective force created will compress the spring 48 to position the face seal 42 onto the sealing surface 44. The main piston cavity 46 is in direct communication with the air outlet 50 which sends air to the tires as illustrated in FIG. 1.

Figure 3:
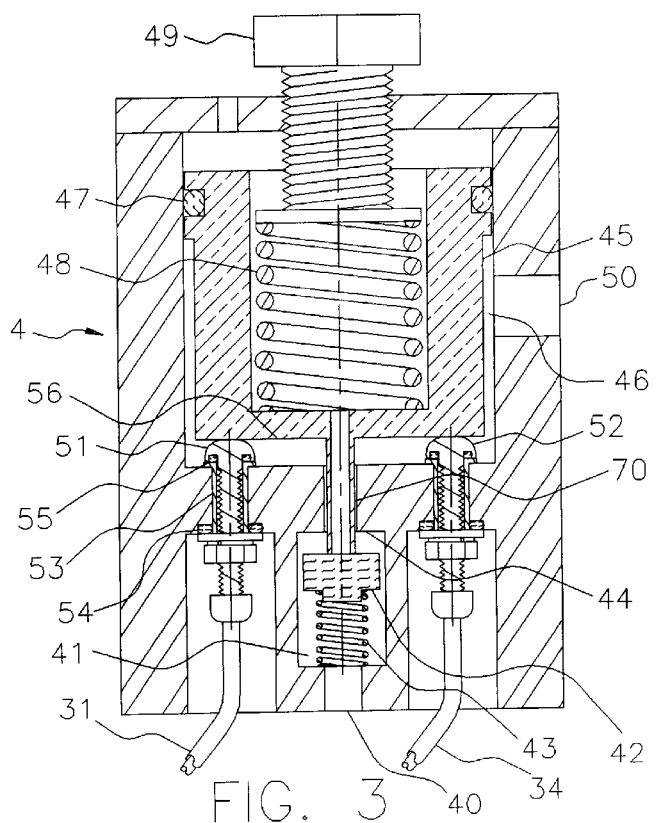
FIG. 3 is a cross-sectional drawing of the valve and switch with at least one tire's air pressure below the pressure regulator's adjusted pressure, and the pressure regulator is open and the switch is closed.

When a tire's pressure drops, the air pressure inside the main piston cavity 46 also drops, and as shown in FIG. 3, the main spring 48 forces the piston 45 to move the face seal 42 away from the sealing surface 44. Now supply air from the air inlet 40 is free to pass from the lower cavity 41, through the passage 70, and into the upper piston cavity 46. When the piston 45 is in this position, an electrically conductive material located on the lower end 56 of the piston conducts electricity between the two electrical contacts 51 and 52. Each electrical contact is insulated from the body with a non-conductive material 53 about the contacts, and o-rings 54 and 55 prevent air passage between the body cavities 41 and 46.

Only when the tire pressure has returned to its proper pressure will the air pressure inside the main piston cavity 46 force the piston 45 upwardly against the main spring 48. This closes the face seal 42 and also breaks the electrical connection between the contacts 51 and 52, consequently turning off the alert mechanism.

Figure 4:
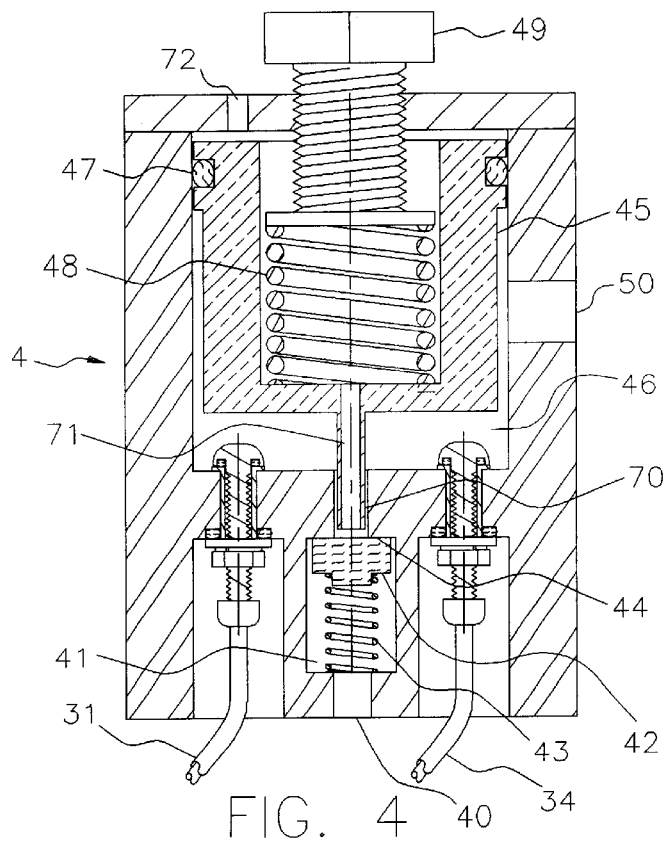
FIG. 4 is a cross-sectional drawing of the valve and switch with too much outlet air pressure and the regulator is in the exhaust position and the switch is open.

The valve 4 can take another position as shown in FIG. 4. Here excessive air pressure has developed in the upper cavity 46. To prevent over pressurization of the tires, the additional air pressure forces the piston 45 and its seal 47 to further compress the spring 48. The piston 45, which has as hollow passage 71, moves away from the face seal 43. In this position air pressure from the outlet 50 is exhausted through the passage 71 and to the atmosphere through a vent 72. Only when the pressure inside the cavity 46 has dropped to the adjusted pressure will the piston 45 seat against the face seal 43 and stop air from venting.

Figure 5:
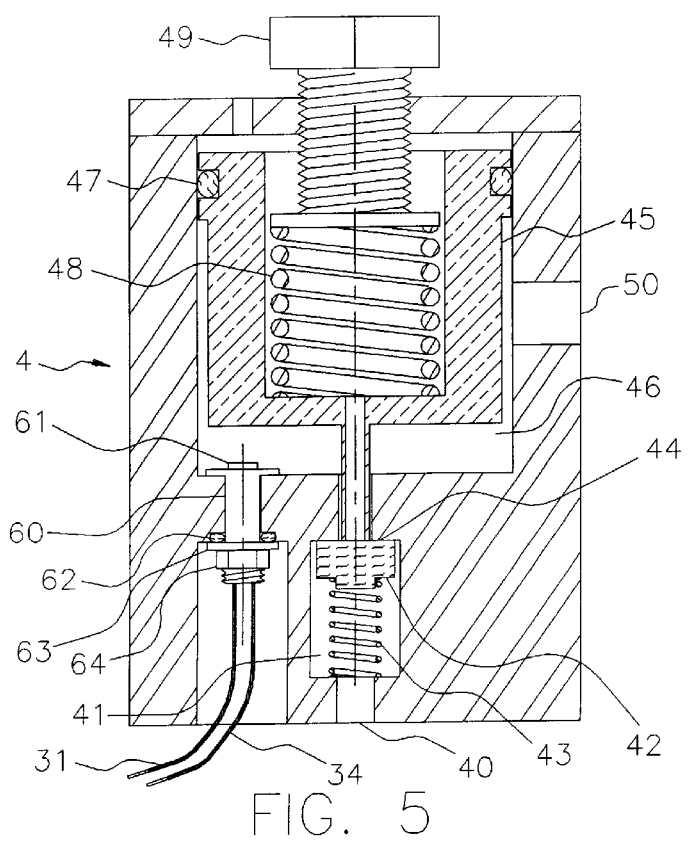
FIG. 5 is a cross-sectional drawing of the invention with an encapsulated limit switch.

FIG. 5 illustrates the invention using a self-contained switch 60 within the valve body. Air pressure regulation functions in the same way as the valve illustrated in FIGS. 2, 3, and 4. The piston 45, when opening or closing the electrical circuit actuates a button 61 on the normally open or normally closed switch 60. The switch 60 must be internally air tight in the case of this drawing. The o-ring 62 that is backed by a washer 63 and held by a nut 64, which is threadably connected to the switch 60, forms a seal around the switch's outer surface. Those familiar in the art should understand that the switch 60 could also be positioned on the non-pressurized side of the piston 45. By placing the switch 60 on the atmospheric side of the piston 45, the switch 60 would not need to be sealed but would still be actuated by the piston 45.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. In a tire inflation system for a vehicle having at least one pneumatic tire, a source of pressurized air carried by the vehicle, a means for delivering air from the source to the rotating tire, and a means to indicate when air is being delivered to the tire by the use of an electrical circuit, the improvement comprising:

a valve which includes a body having a cavity or interior which is divided by a transverse wall into a first chamber and a second chamber on opposite sides thereof, with an air inlet to the first chamber receiving air from said source and air outlet to the second chamber delivering air to said tire;

said transverse wall having a passage to allow air to flow from the first chamber to the second chamber;

a sealing member within the valve interior yieldable urged and seated against said transverse wall and able to restrict flow through said passage from the first chamber to the second chamber;

a reciprocating member within the second chamber sealably partitioning the outlet pressure from the atmosphere and its position responsive to a force resulting from the differential pressure between the outlet pressure and the atmospheric pressure;

a means that biases the reciprocating member against said force and into the sealing member to actuate the sealing member away from said transverse wall to allow air to flow through said passage from the first chamber to the second chamber and increase outlet pressure until outlet pressure moves the reciprocating member by overcoming the biasing means and allows the sealing member to seat against said transverse wall and stop air flow through said passage; and a normally closed electrical switch responsive to the reciprocating member's position so that, when the outlet pressure overcomes said biasing means and moves the reciprocating member, the electrical switch opens and breaks the completion of said electrical circuit.

2. As in claim 1, wherein the electrical switch is normally opened and when the outlet pressure overcomes said biasing means and moves the reciprocating member, the electrical switch closes and completes said electrical circuit.

3. As in claim 1, wherein the reciprocating member is a piston.

4. As in claim 2, wherein the reciprocating member is a piston.

5. As in claim 1, wherein the reciprocating member is a diaphragm.

6. As in claim 2, wherein the reciprocating member is a diaphragm.

7. In a tire inflation system for a vehicle having at least one pneumatic tire, a source of pressurized air carried by the vehicle, a means for delivering air from the source to the rotating tire, and a means to indicate when air is being delivered to the tire, the improvement comprising a valve:

having an inlet for receiving air from said source;

an outlet for delivering air to said tire;

a conduit within the valve body for passing air from said inlet to said outlet;

a sealing member able to restrict flow through said conduit from said inlet to said outlet;

an actuating member within the valve body sealably partitioning the outlet pressure from the atmosphere and its position responsive to changes in outlet pressure;

a spring that biases said actuating member into said sealing member and forces said sealing member to allow flow between said inlet and outlet until sufficient outlet pressure is applied to said actuating member to overcome the spring; and a normally closed electrical switch responsive to said actuating member's position so that when the outlet pressure overcomes said spring's bias, said sealing member is allowed to close communication between said inlet and said outlet and the electrical switch opens.

8. As in claim 7, wherein the electrical switch is normally opened and when the outlet pressure is applied to said actuator to overcome said spring's bias, said sealing member is allowed to close communication between said inlet and said outlet and the electrical switch closes.

* * * * *